United States Patent [19]
Schilling

[11] Patent Number: 5,410,568
[45] Date of Patent: Apr. 25, 1995

[54] CDMA/TDMA SPREAD-SPECTRUM COMMUNICATIONS SYSTEM AND METHOD

[75] Inventor: Donald L. Schilling, Sands Point, N.Y.

[73] Assignee: InterDigital Technology Corporation, Wilmington, Del.

[21] Appl. No.: 145,124

[22] Filed: Nov. 3, 1993

Related U.S. Application Data

[63] Continuation of Ser. No. 819,906, Jan. 13, 1992, Pat. No. 5,260,967.

[51] Int. Cl.⁶ .............................................. H04L 9/00
[52] U.S. Cl. ...................... 375/205; 370/18; 375/206
[58] Field of Search ............... 375/1; 380/49; 379/63, 379/61; 370/19, 18, 95

[56] References Cited

U.S. PATENT DOCUMENTS

| | | | |
|---|---|---|---|
| 3,778,715 | 12/1973 | Schmidt et al. | 325/2 |
| 4,222,115 | 9/1980 | Cooper et al. | 375/1 |
| 4,247,942 | 1/1981 | Hauer | 375/25 |
| 4,392,220 | 7/1983 | Hirosaki et al. | 370/18 |
| 4,418,425 | 11/1983 | Fennel, Jr. et al. | 455/27 |
| 4,425,642 | 1/1984 | Moses et al. | 370/76 |
| 4,455,651 | 6/1984 | Baran | 370/104 |
| 4,470,138 | 9/1984 | Gutleber | 370/18 |
| 4,494,228 | 1/1985 | Gutleber | 370/18 |
| 4,532,635 | 7/1985 | Mangulis | 375/1 |
| 4,549,303 | 10/1985 | Gutleber | 375/25 |
| 4,563,774 | 1/1986 | Gloge | 455/607 |
| 4,587,661 | 5/1986 | Schiff | 375/1 |
| 4,587,662 | 5/1986 | Langewellpott | 375/1 |
| 4,607,375 | 8/1986 | Lee | 375/2.2 |
| 4,612,637 | 9/1986 | Davis et al. | 370/95 |
| 4,621,365 | 11/1986 | Chiu | 375/1 |
| 4,649,549 | 3/1987 | Halpern et al. | 380/32 |
| 4,672,658 | 6/1987 | Kavebrad et al. | 379/63 |
| 4,901,307 | 2/1990 | Gilhousen et al. | 370/18 |
| 4,912,721 | 3/1990 | Pidgeon, Jr. et al. | 375/1 |
| 5,031,192 | 7/1991 | Clark | 375/1 |
| 5,085,900 | 1/1992 | Taylor | 375/1 |
| 5,138,631 | 8/1992 | Taylor | 375/1 |
| 5,177,765 | 1/1993 | Holland et al. | 375/1 |
| 5,260,967 | 11/1993 | Schilling | 375/1 |
| 5,265,119 | 11/1993 | Gilhousen et al. | 375/1 |

*Primary Examiner*—David C. Cain
*Attorney, Agent, or Firm*—David Newman & Associates

[57] ABSTRACT

A spread-spectrum transmitter and receiver using code division multiple access with time division multiple access technology for spread-spectrum communications. At a base station, a spread-spectrum transmitter includes a multiplexer for time multiplexing a synchronization-code signal and a plurality of data signals, which may be encoded as a plurality-encoded data signals, to generate a time-multiplexed signal. A chip-code generator generates a chip-code signal which is modulo added with the time-multiplexed signal by an EXCLUSIVE-OR gate to generate a spread-spectrum-time-multiplexed signal. A transmitter transmits the spread-spectrum-time-multiplexed signal over a communications channel. A spread-spectrum receiver at the base station processes a plurality of spread-spectrum signals, received from a plurality of remote units in as time division sequence of spread-spectrum signals, using a despreader circuit to generate a time-division signal. A demultiplexer demultiplexes the time-division signal as a plurality of data signals or as a plurality of privacy-encoded data signals. A remote unit, which may be a handset, includes a despreader circuit for despreading the spread-spectrum-time-multiplexed signal as a time-multiplexed signal. A synchronization-code matched filter detects the synchronization-code signal embedded in the time-multiplexed signal and thereby generates a timing signal. A controller uses the timing signal to generate a control signal. The control signal controls a transmit-receive switch for switching an antenna between the despreader circuit to the transmitter at the remote unit.

24 Claims, 7 Drawing Sheets

CDMA/TDMA SPREAD-SPECTRUM COMMUNICATIONS SYSTEM AND METHOD

RELATED PATENTS

This patent is a continuation of patent application entitled, CDMA/TDMA SPREAD SPECTRUM SYSTEM AND METHOD, having Ser. No. 07/819,906 and filing data Jan. 13, 1992, now U.S. Pat. No. 5,260,967. The benefit of the earlier filing data of the parent patent application is claimed pursuant to 35 U.S.C. §120.

BACKGROUND OF THE INVENTION

The present invention relates to spread-spectrum communications, and more particularly to a direct sequence, code division multiple access, time division multiple access, spread-spectrum system.

DESCRIPTION OF THE RELEVANT ART

Spread-spectrum modulation has been, and still is used extensively in military communications systems both to permit communications which are not detectable by enemy jamming systems, and to resist jamming by an enemy desiring to disrupt communications. Signals which are not detectable by enemy intercept systems are called low probability of intercept signals.

For commercial applications using spread-spectrum modulation, full duplex operation is desirable, allowing a base station and a remote unit to communicate with each other simultaneously. One approach for full duplex is to assign a pair of chip codewords unique to the base station and the remote unit, and have them communicate simultaneously in time and at the same carrier frequency with each other. A problem with this approach is that the spread-spectrum signal radiated at the remote unit raises the noise level at the input to the spread-spectrum receiver at the remote unit.

Another approach for full duplex operation, which alleviates the problem of having the spread-spectrum transmitter raising the noise power level at the input to the spread-spectrum receiver at the remote unit or base station, is to assign different carrier frequencies for transmitting and receiving. Thus, the base station may communicate to a plurality of remote units at a first carrier frequency $f_1$ and the plurality of remote units may communicate to the base station at a second carrier frequency $f_2$. Using two carrier frequencies requires filters at each remote unit and at the base station to prevent leakage of signal energy from the respective spread-spectrum transmitter to the spread-spectrum receiver at each remote unit and at the base station. Additionally, different and long chip codewords are required with multiple remote units, which require complicated acquisition and tracking circuits. Using filters and long chip codewords adds to increased circuit complexity and cost.

OBJECTS OF THE INVENTION

A general object of the invention is a mobile cellular communications system, which allows full duplex operation without the need for complex filters for separating transmitter and receiver frequencies and complex tracking and acquisition circuits.

Another object of the invention is an inexpensive personal communications network, mobile cellular communications system.

An additional object of the invention is a spread-spectrum communications system which has little or no interference between users.

A still further object of the invention is a spread-spectrum system in which the system performance is thermal noise power limited rather than interference limited.

SUMMARY OF THE INVENTION

The present invention provides a system and method which transmit a code division multiple access (CDMA), time division multiple access (TDMA), spread-spectrum communications signal between a base station and a plurality of remote units. The base station time multiplexes a synchronization-code signal and a first plurality of data signals, or a first plurality of privacy-encoded data signals, to generate a time-multiplexed signal, and then spread-spectrum processes the time-multiplexed signal with a first chip-code signal to generate a spread-spectrum-time-multiplexed signal. The spread-spectrum-time-multiplexed signal is defined herein to include a time-multiplexed signal which is spread-spectrum processed with a chip-code signal.

Each remote unit receives and despreads the spread-spectrum-time-multiplexed signal, and demultiplexes a respective data signal being sent to the remote unit embedded in the time-multiplexed signal as a function of the synchronization-code signal. At a specified time, the remote unit sends a remote-data signal, or a remote-privacy-encoded data signal, to the base station by spread-spectrum processing the remote-data signal, or remote-privacy-encoded data signal, and transmitting the spread-spectrum signal over the communications channel. Since the remote unit is not transmitting and receiving at the same time, a transmit-receive switch can be employed to switch an antenna between the despreader circuitry and the transmitter at the remote unit. A remote-data signal is defined herein as a data signal being sent from a remote unit to the base station. A remote-privacy-encoded-data signal is defined herein as an encoded remote-data signal being sent from the remote unit to the base station.

At the base station, a plurality of spread-spectrum signals are received from the plurality of remote units as a spread-spectrum-time-division signal, which is despread as a time-division signal. The time-division signal accordingly is demultiplexed as a plurality of remote-data signals, or a plurality of remote-privacy-encoded data signals. The spread-spectrum-time-division signal is defined herein to include a plurality of spread-spectrum signals received sequentially in time from a plurality of remote units. The time-division signal is defined herein to include a plurality of remote-data signals, or a plurality of remote-privacy-encoded data signals, which are in different time slots due to the timing of when they are sent from each of the plurality of remote units.

More particularly, a spread-spectrum transmitter at the base station includes base-synchronization means, a plurality of base-privacy means, multiplexer means, base-spreading means, and base-transmitter means. The synchronization means generates a synchronization-code signal, and the plurality of base-privacy means encodes a plurality of data signals with a plurality of privacy-code signals as a plurality of privacy-encoded data signals, respectively. The encoding with a privacy-code signal may be an encryption type of privacy, or a less secure type of privacy. The multiplexer means time multiplexes the synchronization-code signal and the plurality of privacy-encoded data signals, respectively, to generate a time-multiplexed signal. The base-spreading means spread-spectrum processes the time-multiplexed signal with a first chip-code signal to generate a spread-spectrum-time-multiplexed signal. The time-multiplexed signal is converted by base-transmitter means to a form suitable for sending over the communications channel.

The plurality of base-privacy means is optional, and accordingly, the plurality of data signals need not be encoded with the plurality of privacy-code signals as a plurality of privacy-encoded data signals. If the plurality of privacy means were not used, then the multiplexer means time multiplexes the plurality of data signals to generate a time-multiplexed signal.

The spread-spectrum receiver at the base station processes a spread-spectrum-time-division signal using base-despreader means, base-demultiplexer means, base-synchronization means, and optionally, a plurality of base-decoder means. The base-despreader means despreads a received spread-spectrum-time-division signal as a time-division signal. The base-demultiplexer means demultiplexes the time-division signal as a plurality of remote-data signals or, in the event the plurality of data signals were encoded, as a plurality of remote-privacy-encoded data signals. The base-synchronization means, which is the same as used by, and operates cooperatively with, the spread-spectrum transmitter at the base station, generates the synchronization-code signal and a timing signal. In response to the timing signal, each of the base-decoder means decodes each of the remote-privacy-encoded signals as a remote-data signals.

At a remote unit, a spread-spectrum-time-multiplexed signal is received at the first carrier frequency. As set forth previously, the spread-spectrum-time-multiplexed signal includes a synchronization-code signal and a plurality of privacy-encoded data signals. The privacy-encoded-data signal to be received by the remote unit is defined herein to be the first privacy-encoded-data signal. A remote-data signal is spread-spectrum transmitted from the remote unit at a second carrier frequency.

The remote unit includes remote-despreader means, remote-synchronization means, control means, remote-decoder means, remote-privacy means, remote-spreading means, and remote-transmitter means. The remote-despreader means despreads the spread-spectrum-time-multiplexed signal received from the base station as a time-multiplexed signal. The remote-synchronization means detects the synchronization-code signal embedded in the time-multiplexed signal, and generates a timing signal. The control means generates a control signal in response to the synchronization-code signal. The control signal has the proper timing, relative to the synchronization-code signal, for operating the remote unit. The proper timing includes having the appropriate data signal or privacy-encoded data signal embedded in the time-multiplexed signal stored in a buffer. The remote-decoder means, using timing from the control signal, decodes a first privacy-encoded data signal embedded in the time-multiplexed signal as a first data signal.

In response to the control signal, the remote-privacy means encodes the remote-data signal with a remote-privacy-code signal as a remote-privacy-encoded data signal. The remote-privacy-code signal is defined herein to include any signal that can be used to encrypt or add privacy to the remote-data signal. The remote-spreading means spread-spectrum processes the remote-privacy-encoded data signal with a second chip-code signal as a spread-spectrum signal. The remote-transmitter means at the remote unit converts the spread-spectrum signal to a form suitable for sending over the communications channel. The second chip-code signal, which is generated at each of the plurality of remote units, may be the same as the first chip-code signal generated at the base station.

The present invention also includes, at a base station, the method for spread-spectrum processing a plurality of data signals on a first carrier frequency by generating a synchronization-code signal, encoding the plurality of data signals with a plurality of privacy-code signals as a plurality of privacy-encoded data signals, time multiplexing the synchronization-code signal and the plurality of privacy-encoded data signals, respectively, to generate a time-multiplexed signal, spread-spectrum processing the time-multiplexed signal with a first chip-code signal to generate a spread-spectrum-time-multiplexed signal, and converting the spread-spectrum-time-multiplexed signal to a form suitable for sending over the communications channel.

Also, at the base station, the method includes receiving a spread-spectrum-time-division signal by despreading the spread-spectrum-time-division signal as a time-division signal, demultiplexing the time-division signal as a plurality of remote-privacy-encoded data signals, generating a timing signal, and decoding, using the timing signal, the plurality of remote-privacy-encoded signals as a plurality of remote-data signals.

Additional objects and advantages of the invention are set forth in part in the description which follows, and in part are obvious from the description, or may be learned by practice of the invention. The objects and advantages of the invention also may be realized and obtained by means of the instrumentalities and combinations particularly pointed out in the appended claims.

BRIEF DESCRIPTION OF THE DRAWINGS

The accompanying drawings, which are incorporated in and constitute a part of this specification, illustrate particular embodiments of the invention, and together with the description, serve to explain the principles of the invention.

FIB. 8 is a timing diagram of data transmitted between the base station of FIG. 7 and a plurality of remote units.

DETAILED DESCRIPTION OF THE PREFERRED EMBODIMENTS

Reference will now be made to the preferred embodiments of the present invention, examples of which are illustrated in the accompanying drawings, wherein like reference numerals indicate to like elements throughout the several views.

Figure 1:
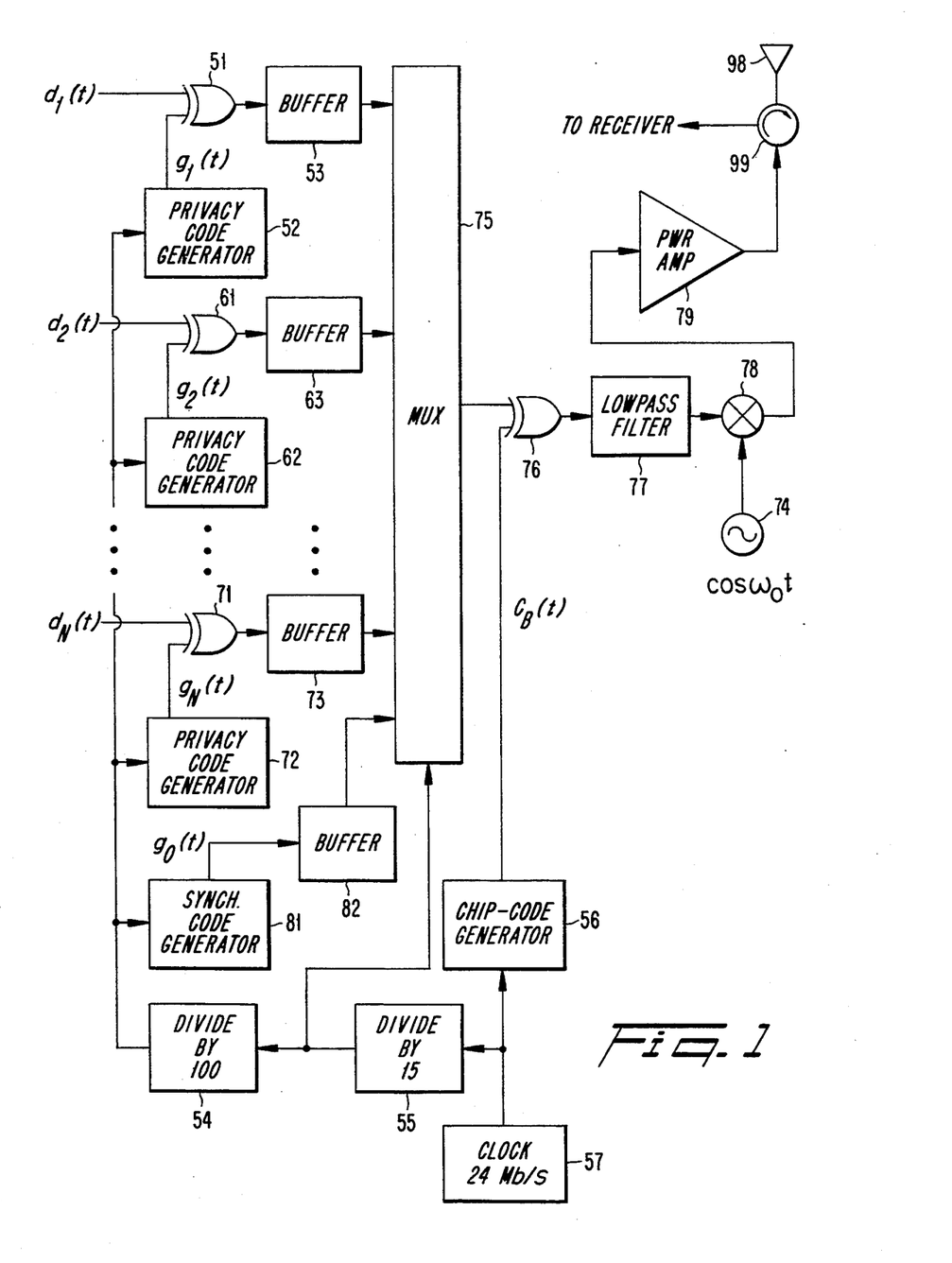
FIG. 1 is a block diagram of a base station transmitter.

In the exemplary arrangement shown in FIG. 1, a spread-spectrum transmitter which can be used for spread-spectrum processing a plurality of data signals on a first carrier frequency, $f_1$, is shown comprising base-synchronization means, a plurality of base-privacy means, multiplexer means, base-spreading means, and base-transmitter means. The base-synchronization means is coupled to the multiplexer means. The plurality of base-privacy means is coupled between a plurality of inputs having the plurality of data signals, and the multiplexer means. The plurality of data signals includes the first data signal, $d_1(t)$, second data signal $d_2(t)$, through $N^{th}$ data signal, $d_N(t)$. Each data signal is assumed to be sent to a respective remote unit. The base-spreading means is coupled between the multiplexer means and the base-transmitter means.

The base-synchronization means is shown as a synchronization code generator 81 and the synchronization buffer 82. The synchronization buffer 82 is coupled to the synchronization code generator 81. Also shown is a clock 57 which is coupled through a first divider 55 and a second divider 54 to the synchronization-code generator 81.

The plurality of base-privacy means is embodied as a plurality of privacy-code generators, shown as first privacy-code generator 52, second privacy-code generator 62, through $N^{th}$ privacy-code generator 72, coupled to a plurality of EXCLUSIVE-OR gates, shown as first EXCLUSIVE-OR gate 51, second EXCLUSIVE-OR gate 61, through $N^{th}$ EXCLUSIVE-OR gate 71, respectively. More particularly, the first EXCLUSIVE-OR gate 51 is coupled to the first privacy-code generator 52 and to a first input having the first input signal, $d_1(t)$. The second EXCLUSIVE-OR gate is coupled to the second input which provides the second data signal, $d_2(t)$, and to second privacy-code generator 62. The $N^{th}$ EXCLUSIVE-OR gate is coupled to the $N^{th}$ input which provides the $N^{th}$ data signal, $d_N(t)$, and to the $N^{th}$ privacy-code generator 72.

The multiplexer means is embodied as a plurality of buffers, shown as first buffer 53, second buffer 63 through $N^{th}$ buffer 73 and a synchronization buffer 82, and a multiplexer 75. The multiplexer 75 is coupled to the first buffer 53, second buffer 63, through $N^{th}$ buffer 73, and to the synchronization buffer 82. The first buffer 53 is coupled to the first EXCLUSIVE-OR gate 51. The second buffer 63 is coupled to the second EXCLUSIVE-OR gate 61. The $N^{th}$ buffer 73 is coupled to the $N^{th}$ EXCLUSIVE-OR gate 71. The synchronization buffer 82 is coupled to the synchronization-code generator 81. The multiplexer 75 has its timing coupled to the output of the first divider 55. The first divider 55 divides the time of the clock signal from clock 57.

The base-spreading means is embodied as an EXCLUSIVE-OR gate 76, lowpass filter 77, and a chip-code generator 56. The EXCLUSIVE-OR gate 76 is coupled to the multiplexer 75, to the lowpass filter 77, and to the chip-code generator 56. The chip-code generator 56 also is coupled to the clock 57. The output of the EXCLUSIVE-OR gate 76 is coupled to a lowpass filter 77.

The clock 57 provides an appropriate clock signal for operation of the spread-spectrum transmitter and receiver at the base station. The clock signals are time divided by first divider 55 and second divider 54. The divided clock signal outputted from second divider 54 is used for timing of the plurality of privacy-code generators, and the synchronization code generator. The divided clock signal outputted from first divider 55 is used for timing of the multiplexer 75. For the embodiment of FIG. 1, the first divider 55 divides the timing of the clock signal by 15, and the second divider 54 divides the timing from the first divider 55 by 100.

The base-transmitter means is embodied as an oscillator 74 which generates a first carrier frequency, $f_1$, a product device 78, and a power amplifier 79. The product device 78 is coupled between the oscillator 74, and the lowpass filter 77 and power amplifier 79. The output of the power amplifier 79 typically is coupled through an isolator 99 which may be embodied as a circulator, to an antenna 98. The isolator 99 also is coupled to a receiver at the base station.

The plurality of data signals, $d_1(t)$, $d_2(t)$, ..., $d_N(t)$, are encoded by the plurality of EXCLUSIVE-OR gates 51, 61, 71 with the plurality of privacy-code signals, $g_1(t)$, $g_2(t)$, ..., $g_N(t)$, which are generated by the plurality of privacy-code generators 52, 62, 72, respectively. The plurality of EXCLUSIVE-OR gates 51, 61, 71 modulo-2 add each of the respective privacy-code signals $g_1(t)$, $g_2(t)$, ..., $g_N(t)$, to each of the plurality of data signals, $d_1(t)$, $d_2(t)$, ..., $d_N(t)$, respectively, to generate a plurality of privacy-encoded-data signals. The plurality of privacy-encoded-data signals are stored in the plurality of buffers 53, 63, 73.

Each of the privacy-code signals may be an encrypting signal or a signal which provides privacy to particular data signal, as is well known in the art. Other types of encoding may be used, such as encryption with the Data Encryption Standard.

The synchronization-code generator 81 generates a synchronization-code signal. The synchronization-code signal is stored in the synchronization buffer 82.

The multiplexer 75 from the synchronization buffer 82 time multiplexes the synchronization-code signal and from the plurality of buffers 53, 63, 73, the plurality of privacy-encoded-data signals, respectively, to generate a time-multiplexed signal. Typically, the synchronization-code signal is initially time multiplexed in a first time slot, and then sequentially, the first privacy-encoded-data signal, second privacy-encoded-data signal, through $N^{th}$ privacy-encoded-data signal are time multiplexed in subsequent time slots. A frame of data is defined herein as the time-multiplexed synchronization-code signal and the plurality of privacy-encoded signals. Accordingly, a time-multiplexed signal includes a frame of data. The synchronization-code signal may be a sequence of 1-bits and 0-bits used for identifying the beginning of each frame of data.

Based on the timing from the synchronization-code signal, a particular privacy-encode data signal can be determined. Preferably, each of the privacy-encoded-data signals and the synchronization-code signal have the same number of bits for a time slot, although a different length sequence of bits could be used for the synchronization-code signal.

The chip-code generator 56 generates a first chip-code signal using a first chip codeword. The time-multiplexed signal outputted from the multiplexer 75, and the first chip-code signal, $C_B(t)$, from the chip-code generator 56, are spread-spectrum processed by the EXCLUSIVE-OR gate 76 to generate a spread-spectrum-time-multiplexed signal. The spread-spectrum processing typically is modulo-2 adding the time-multiplexed signal with the chip-code signal using the EXCLUSIVE-OR gate 76. The lowpass filter 77 filters the spread-spectrum-time-multiplexed signal to remove out-of-band energy. The filtered spread-spectrum-time-multiplexed signal is then frequency translated, by operation of the product device 78 and the first carrier signal supplied by the first oscillator 74, to the first carrier frequency, $f_1$. Thus, after amplification by power amplifier 79, the spread-spectrum-time-multiplexed signal is transmitted at the first carrier frequency, $f_1$, by antenna 98 over a communications channel.

As an example, assume the synchronization-code signal and 100 privacy-encoded data signals are multiplexed by the multiplexer 75 at multiplex rate, $f_M$. In this example, assume that each data signal is sampled at the rate of 16 kilobit per second (kb/s) and compressed by the factor 101. The resulting data rate, $d_M$, in the time-multiplexed signal is $101 \times 16$ kb/s, which is approximately 1.6 Mb/s. The time-multiplexed signal is then spread by EXCLUSIVE-OR gate 76 using a short first chip-code signal generated from a 15 chip codeword by chip-code generator 56. Each remote unit uses the same first chip-code signal, $c_B(t)$.

Figure 2:
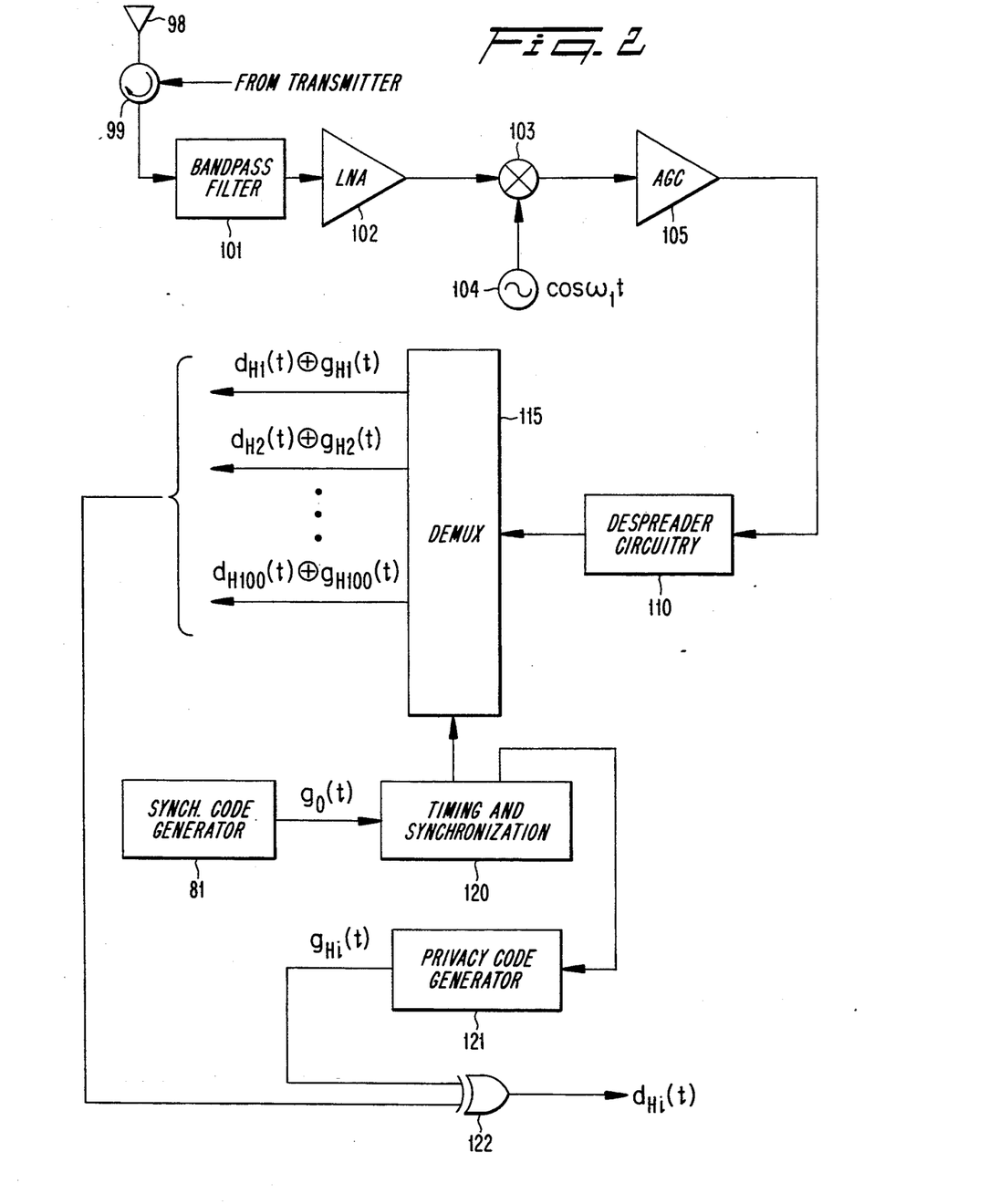
FIG. 2 is a block diagram of a base station receiver.

As illustratively shown in FIG. 2, a spread-spectrum receiver for spread-spectrum processing a spread-spectrum-time-division signal is shown comprising the antenna 98, the isolator 99, a bandpass filter 101, a low noise amplifier (LNA) 102, a mixer 103, local oscillator 104, automatic-gain-control (AGC) circuit 105, base-despreader means, base-demultiplexer means, base-synchronization means, and base-decoder means. The bandpass filter 101 is coupled through the oscillator 99 to the antenna 98. The isolator 99 also coupled to the transmitter of FIG. 1. The low noise amplifier 102 is coupled between the mixer 103 and the bandpass filter 101, and the mixer 103 is coupled to the local oscillator 104 which generates a first local signal. The AGC circuit 105 is coupled between the mixer 103 and the base-despreader means. The base-demultiplexer means is coupled to the base-despreader means, to the base-synchronization means and to the base-decoder means.

Figure 4:
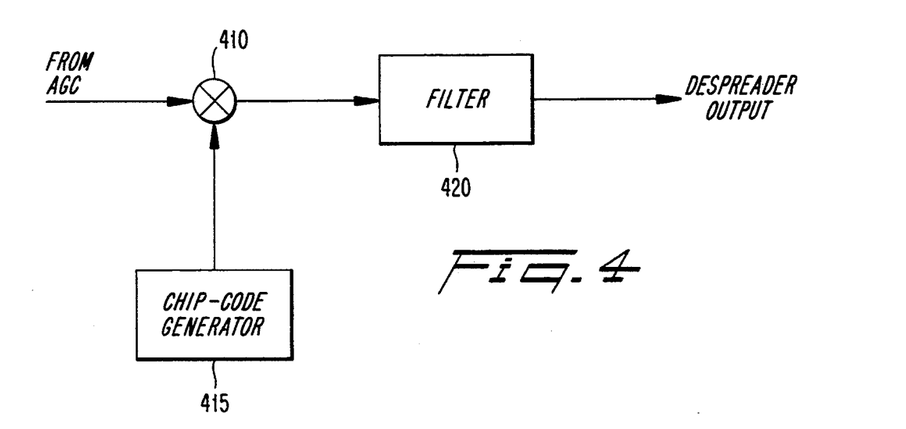
FIG. 4 is a block diagram of a correlator for despreading spread-spectrum signals.

In FIG. 2, the base-despreader means is embodied as despreader circuitry 110, the base-demultiplexer means is embodied as the demultiplexer 115, the base-synchronization means is embodied as the synchronization-code generator 81 and the timing and synchronization circuit 120, and the base-decoder means is embodied as a privacy-code generator 121 and an EXCLUSIVE-OR gate 122. The despreader circuitry 110 may be a matched filter, a correlator, or any other circuit which can be used for despreading a received spread-spectrum signal having spread-spectrum modulation. A matched filter may be implemented using a tapped-delay-line filter, such as a surface-acoustic-wave device. A typical correlator which can be used for despreading a spread-spectrum signal is depicted in FIG. 4, and includes a mixer 410, chip-code generator 415 and filter 420.

The demultiplexer 115 is coupled to the despreader circuitry 110. The synchronization-code generator 81 is coupled to the timing and synchronization circuit 120, and the timing and synchronization circuit 120 is coupled to the demultiplexer 115 and to the privacy-code generator 121. The privacy-code generator is coupled to the EXCLUSIVE-OR gate 122. For this particular embodiment, the base-decoder means, and accordingly the privacy-code generator 121, are shown for decoding a particular remote privacy-encoded data signal from the plurality of remote-privacy-encoded data signals received by the spread-spectrum receiver. Normally, a plurality of base-decoder means would be employed for decoding a plurality of remote-privacy-encoded-data signals.

A spread-spectrum-time-division signal received by antenna 98 passed through oscillator 99 and is filtered by bandpass filter 101 and amplified by low noise amplifier 102. The mixer 103, using the first local signal from the local oscillator 104, shifts the received spread-spectrum-time-division signal to the appropriate intermediate frequency or to baseband frequency for processing by the despreader circuitry 110. The appropriate frequency depends on the particular embodiment of the despreader circuitry 110. The AGC circuit 105 normalizes the power of the received spread-spectrum-time-division signal.

The spread-spectrum-time-division signal is defined herein to include a plurality of spread-spectrum signals received sequentially in time from the plurality of remote units. Each remote unit transmits a spread-spectrum signal for a short duration in time. The timing for transmitting from a particular remote unit is at the remote unit's time slot. The remote unit's time slot is with respect to when the remote unit receives the spread-spectrum-time-multiplexed signal from the base station, and decodes the synchronization-code signal. A time slot for a particular remote unit may be fixed, or variable. For a variable time slot, a protocol signal from the base station may set the location of the time slot.

The remote unit generates a control signal from the decoded synchronization-code signal. The control signal sets the time for when each remote unit transmits its own spread-spectrum signal. Each remote unit has its own time slot, which is different from the time slots of the other remote units, for transmitting a spread-spectrum signal. The time slots may be set by the base station by a protocol when a remote unit initiates communication with the base station. A synchronization-code signal is not received, however, at the base station. The timing for defining a frame of a received plurality of spread-spectrum signals from the plurality of remote units is provided at the base station by the synchronization-code generator 81.

The despreader circuitry 110 despreads the received spread-spectrum-time-division signal as a time-division signal. The time-division signal is defined herein to include a plurality of remote-privacy-encoded data signals, or a plurality of remote-data signals, which are in different time slots based on the time when each remote unit sent the spread-spectrum signal having the remote-data signal or the remote-privacy-encoded data signal. The despreader circuitry removes the chip-code signal which was added to the spread-spectrum signal by each of the plurality of remote units. If each of the plurality of remote units uses the same chip codeword, then only one despreader circuitry is required. The plurality of remote units may be divided into two or more sets of remote units, with each set using it own chip codeword. For each of the chip codewords the despreader circuitry would include corresponding devices, connected in parallel, for despreading each of the corresponding set of spread-spectrum signals. Although some of the spread-spectrum signals would be received with a different spreading sequence, they are still received sequentially in time from the plurality of remote units. Thus, a time-division signal, as defined herein, would be outputted form the despreader circuitry.

The received time-division signal is demultiplexed by the demultiplexer 115 as a plurality of remote-privacy-encoded data signals, or a plurality of remote-data signals if the spread-spectrum signals sent by the plurality of remote units were not privacy encoded. Essentially, the plurality of remote-privacy-encoded data signals were transmitted by a remote unit, and each remote-privacy-encoded data signal is decoded by decoder circuitry which, for a particular remote-privacy-encoded-data signal, includes the privacy-code generator 121 and EXCLUSIVE-OR gate 122.

The synchronization-code generator 81, which is the same as used by the spread-spectrum transmitter of FIG. 1, generates the synchronization-code signal which triggers the timing and synchronization circuit 120 to generate a timing signal for clocking the demultiplexer 115. The timing signal also triggers the privacy-coded generator 121 so that the remote-privacy-encoded signal from the demultiplexer 115 is decoded at the appropriate time.

The present invention also includes a plurality of remote units, with each remote unit receiving the spread-spectrum-time-multiplexed signal which is transmitted from the base station. The spread-spectrum-time-multiplexed signal has a synchronization-code signal and the plurality of privacy-encoded data signals, at the first carrier frequency. Within the plurality of privacy-encoded data signals is a particular privacy-encoded data signal, defined herein as a first privacy-encoded data signal, to be received by the remote unit. The remote unit also spread-spectrum transmits a remote-data signal at a second carrier frequency. Generally, the remote unit includes remote-despreader means, remote-synchronization means, control means, remote-decoder means, remote-privacy means, remote-spreading means, and remote-transmitter means.

Figure 3:
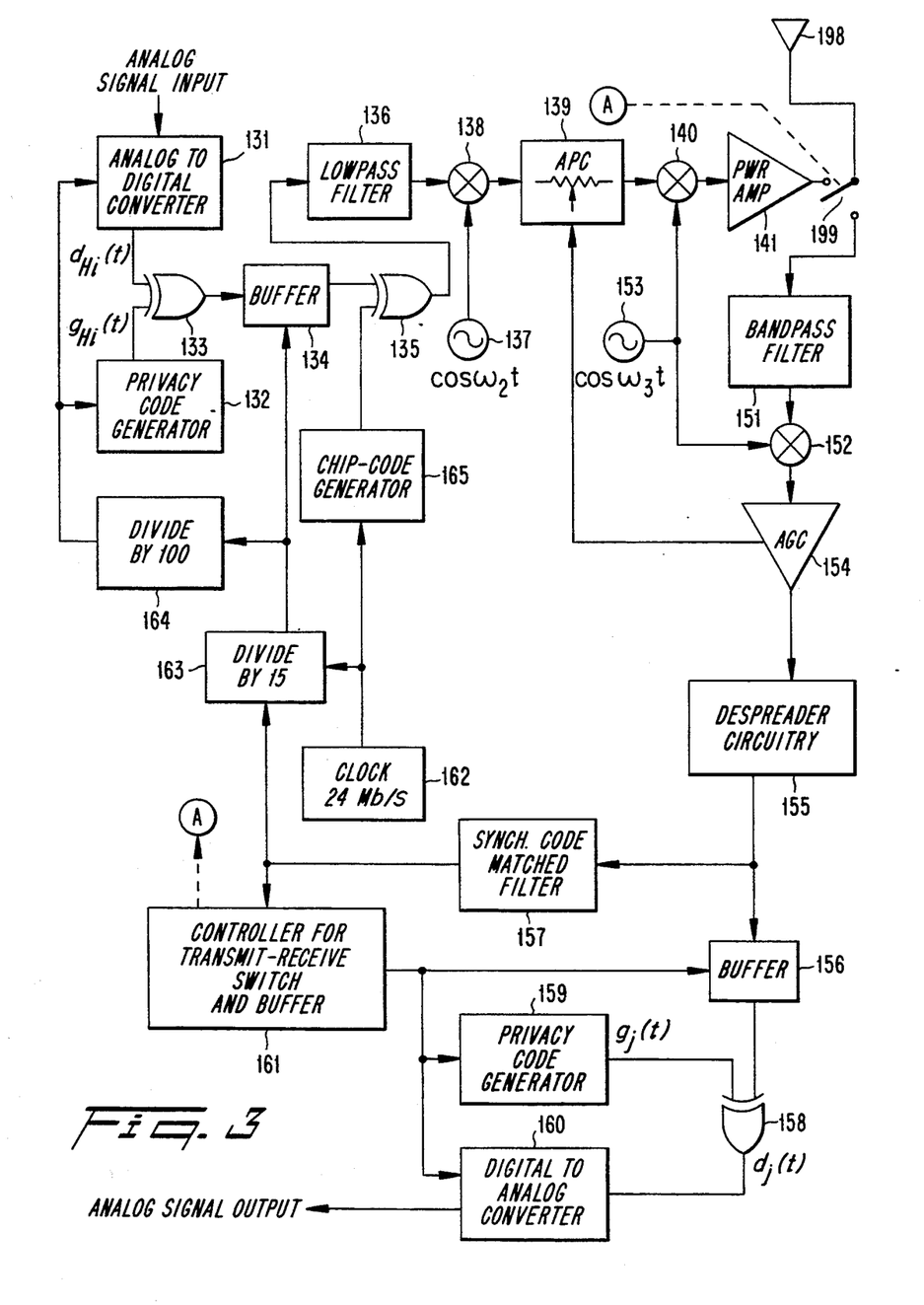
FIG. 3 is a block diagram of a remote unit transmitter and receiver.

As illustratively shown in FIG. 3, an antenna 198 is coupled through a transmit-receive switch 199 to a bandpass filter 151. The bandpass filter 151 is coupled to a mixer 152, which is also coupled to the second oscillator 153. The mixer 152 is coupled to an automatic-gain-control (AGC) circuit 154.

The remote-despreader means is embodied as despreader circuitry 155, the remote-synchronization means is embodied as synchronization-code matched filter 157, control means is embodied as the controller 161. The remote-decoder means is shown as buffer 156, privacy-code generator 159, and EXCLUSIVE-OR gate 158. Also illustrated is a digital-to-analog converter 160.

The spread-spectrum transmitter for the remote unit includes remote-privacy means, remote-spreading means, and remote-transmitter means. The remote-privacy means is embodied as a privacy-code generator 132, an EXCLUSIVE-OR gate 133 and buffer 134. The remote-spreading means is embodied as the chip-code generator 165, an EXCLUSIVE-OR gate 135, and low-pass filter 136. The remote-transmitter means is embodied as an oscillator 137, product device 138, optionally an automatic-power-control (APC) circuit 139, and a second product device 140 coupled to the oscillator 153. The remote-transmitter means also may include a power amplifier 141 which is coupled through the transmit-receive switch 199 to the antenna 198.

The clock 162 provides appropriate timing synchronization for operation of the spread-spectrum transmitter and receiver of the remote unit. The clock signals are time-divided by first remote divider 163 and second remote divider 164. For the embodiment of FIG. 3, by way of example, the first remote-divider 163 divides the timing of the clock signal by 15, and the second remote divider 164 divides the timing of the signal from the first remote divider 163 by 100. The timing signals from the second divider 164 provide appropriate timing for the privacy-code generator 132, and analog-to-digital converter 131. The output of the first divider 163 provides timing for the buffer 134.

A received spread-spectrum-time-multiplexed signal at antenna 198 passes through the transmit-receive switch 199 and is filtered by bandpass filter 151. The mixer 152, in cooperation with the oscillator 153, shifts the received spread-spectrum-time-multiplexed signal to an appropriate intermediate frequency or baseband frequency for processing by despreader circuitry 155. The appropriate intermediate frequency or baseband frequency is determined on the particular embodiment of despreader circuitry 155. The AGC circuit 154 normalizes the power of the received spread-spectrum-time-multiplexed signal.

The despreader circuitry 155 may be embodied as a surface-acoustic-wave device, a tapped-delay-line match filter, or a correlator or any other circuitry which may be used for despreading the received spread-spectrum-time-multiplexed signal, as is well known in the art. As illustratively shown in FIG. 4, the correlator may include a chip-code generator 415, a mixer 410 and a filter 420. The despread, spread-spectrum-time-multiplexed signal is the time-multiplexed signal, which was originally sent by the spread-spectrum transmitter at the base station.

The synchronization-code matched filter 157 detects the synchronization-code signal embedded in the time-multiplexed signal, and sends an appropriate timing signal to the controller 161. In response to the timing signal from the synchronization-code-matched filter 157, the controller 161 generates appropriate control signals which actuate buffer 156, privacy-code generator 159 and digital-to-analog converter 160, so that the appropriate channel from the time-multiplexed signal is demultiplexed and received at the remote unit. As an example, the synchronization-code-matched filter 157 may be embodied as a 160 bit stage matched filter, which is matched to a 160 bit codeword used to generate the synchronization-code signal. The buffer 156 stores only the selected privacy-encoded data signal, or the selected data signal, and not the entire time-multiplexed signal. The selected privacy-encoded data signal, or the selected data signal, is the signal which is desired to be received at the remote unit. When receiving the selected first privacy-encoded data signal, the privacy-code generator 159 generates a first privacy-coded signal which is processed by the EXCLUSIVE-OR gate 158 to generate the first data signal. In a preferred embodiment, analog voice may be converted to a data signal and transmitted to a remote unit. In this embodiment, the digital-to-analog converter 160 converts the first data signal to the analog voice signal as an output signal.

If the analog voice were to be transmitted from the remote unit to a base station, then the analog signal input would be converted by analog-to-digital converter 131 to a remote-data signal, $d_{Hi}(t)$. When privacy is used, the remote-data signal is encoded with a remote-privacy-code signal by the EXCLUSIVE-OR gate 133 as a remote-privacy-encoded-data signal. The remote-privacy-code-signal is generated by the privacy-coded generator 132. The remote-privacy-encoded data signal is stored in the buffer 134. With an appropriate timing from the first divider 163, the remote-privacy-encoded data signal is spread-spectrum processed by EXCLUSIVE-OR gate 135 with a second chip-code signal generated by the chip-code generator 165 using the appropriate chip codeword assigned to the remote unit. The lowpass filter 136 filters the spread-spectrum signal. The spread-spectrum signal is shifted to a second carrier frequency by operation of first mixer 138 and oscillator 137, and second mixer 140 and oscillator 153. The APC circuit 139 regulates the power transmitted by the remote station in response to a level provided by AGC circuit 154. The spread-spectrum signal is amplified by power amplifier 141 and radiated by antenna 198.

The controller 161 provides the control signal to the transmit-receive switch 199 so that upon receiving and decoding the synchronization-code signal, and thereby generating the control signal, the transmit-receive switch 199 is directed to the power amplifier 141 for transmitting the spread-spectrum signal. After transmitting the spread-spectrum signal, the transmit-receive switch 199 returns to the position for receiving a spread-spectrum-time-multiplexed signal. The transmit-receive switch 199 is always on receive except during transmission.

Thus, the spread-spectrum receiver of the remote unit detects its received time slot and the synchronization-code signal in the spread-spectrum-time-multiplexed signal received from the base station.

The present invention also includes, at a base station, the method for spread-spectrum processing a plurality of data signals on a first carrier frequency by generating a synchronization-code signal, encoding the plurality of data signals with a plurality of privacy-code signals as a plurality of privacy-encoded data signals, respectively, time-multiplexing the synchronization-code signal and the plurality of privacy-encoded data signals, respectively, to generate a time-multiplexed signal, spread-spectrum processing the time-multiplexed signal with a chip-code signal to generate a spread-spectrum-time-multiplexed signal, and converting the spread-spectrum-time-multiplexed signal to a form suitable for sending over the communications channel.

Also, at the base station, the method includes receiving a spread-spectrum-time-division signal by despreading the spread-spectrum-time-division as a time-division signal, demultiplexing the time-division signal as a plurality of remote-privacy-encoded data signals, generating a timing signal and decoding, using the timing signal, the plurality of remote-privacy-encoded signals as a plurality of remote-data signals.

At a remote unit, the method includes receiving a spread-spectrum-time-multiplexed signal, which has a synchronization signal and a first privacy-encoded-data signal, at a first carrier frequency, and spread-spectrum transmitting a remote-data signal at a second carrier frequency. The second carrier frequency may be the same as the first carrier frequency. The method includes despreading the spread-spectrum-time-multiplexed signal as a time-multiplexed signal, and detecting in the time-multiplexed signal, the synchronization-code signal. In response to detecting the synchronization-code signal, a timing signal and a control signal are generated. A first privacy-encoded-data signal is decoded from the time-multiplexed signal as a first data signal.

The method, at the remote unit, also includes encoding a remote-data signal with a remote-privacy-code signal as a remote-privacy-encoded-data signal. The method spread-spectrum processes the remote-privacy-encoded-data signal with a second chip-code signal as a spread-spectrum signal, and converting the second spread-spectrum signal to a form suitable for sending over a communications channel.

Figure 5:
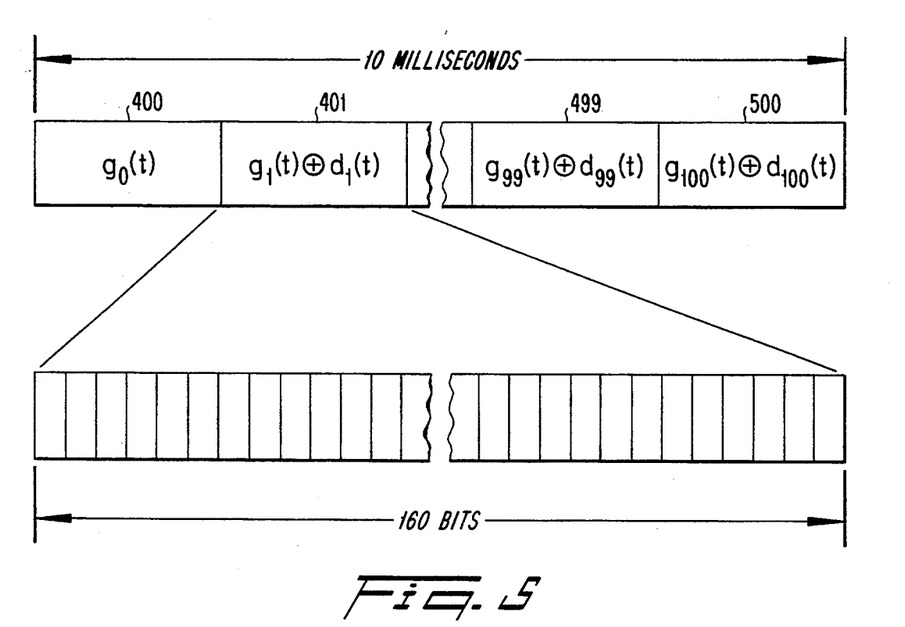
FIG. 5 is a timing diagram of multiplexed data from the base station of FIGS. 1 and 2.

FIG. 5 illustratively shows, at the output of the multiplexer 75, the time-multiplexed signal as a synchronization-code signal, $g_o(t)$ concatenated with a plurality of privacy-encoded data signals. The plurality of privacy-encoded-data signals are represented, by way of example, as 100 privacy-encoded data signals. The plurality of privacy-encoded-data signals alternatively may be a plurality of data signals, if privacy encoding is not used. The first privacy-encoded data signal 401, $99^{th}$ privacy-encoded data signal 499, and $100^{th}$ privacy-encoded data signal 500 are shown. In a particular embodiment, a particular privacy-encoded data signal might be encoded as 160 bits, as illustratively shown in FIG. 5.

Figure 6:
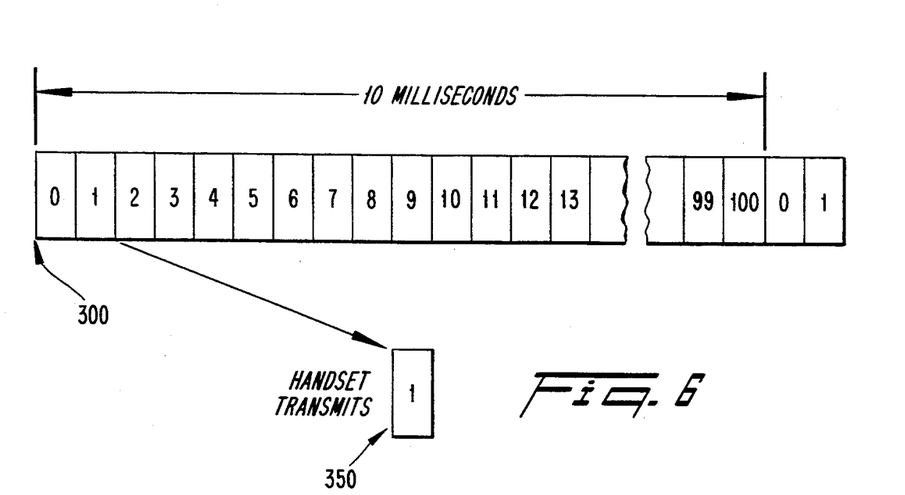
FIG. 6 is a timing diagram of a packet of data transmitted from a first remote unit relative to the multiplexed data transmitted from the base station of FIGS. 1 and 2.

FIG. 6 illustrates the time slots 300 of the time-multiplexed signal, where the synchronization-code signal is at position zero and subsequently followed by 100 slots for privacy-encoded data signals. At a particular remote unit, for example a first remote unit which receives the first channel of the time-multiplexed signal, the remote unit transmits at a short time later a spread-spectrum signal back to the base station. Timing is shown as slot 350 for the remote unit, and the time slots 300 are shown for the base station.

Figure 7:
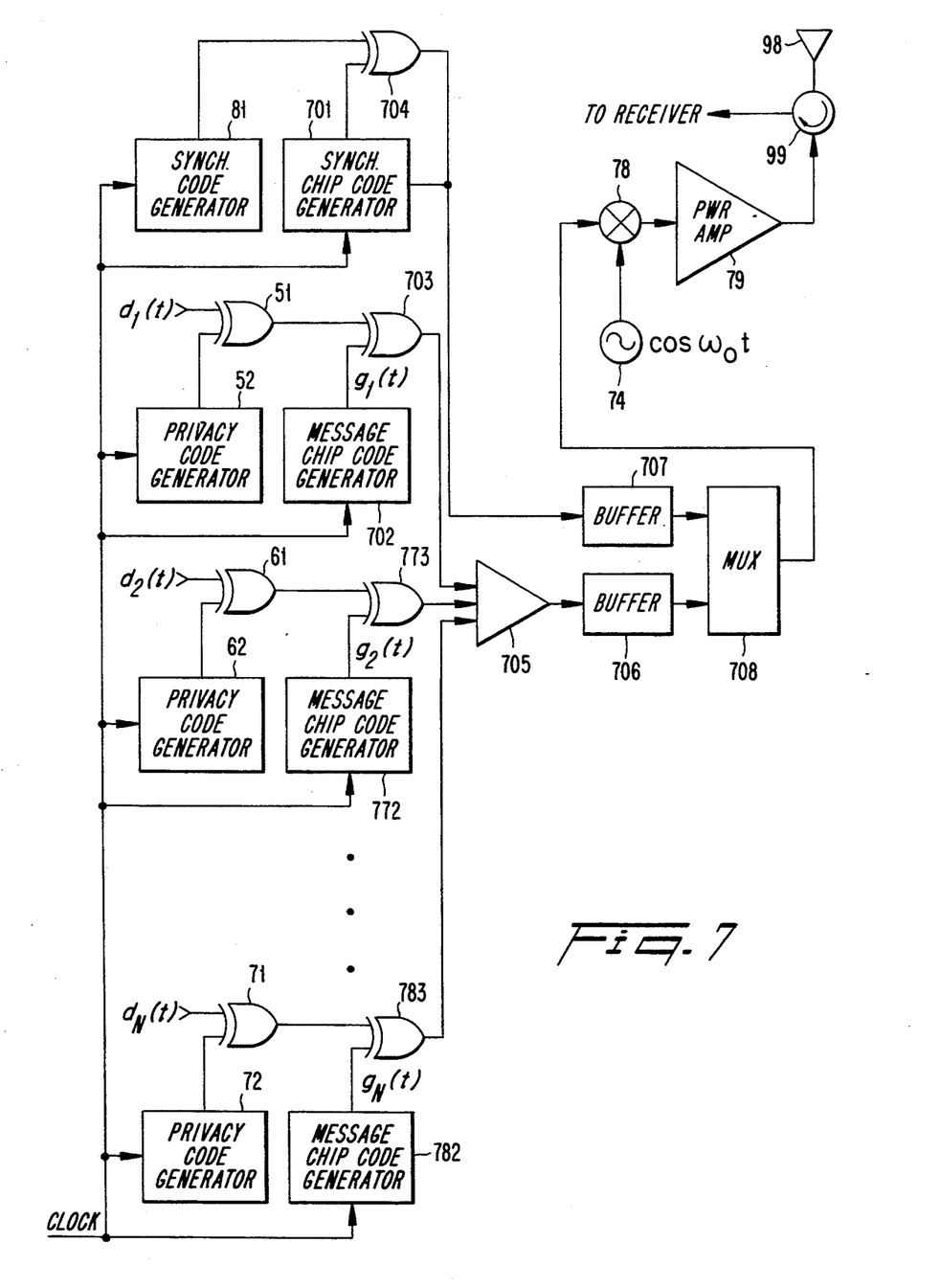
FIG. 7 is a block diagram of a base station transmitter.

The spread-spectrum transmitter at the base station alternatively may transmit the plurality of data signals, or the plurality of privacy-encoded-data signals, at the same time, using code division multiple access. A block diagram for such a base station transmitter is shown in FIG. 7 with its corresponding timing sequence illustrated in FIG. 8. An alternative block diagram for a base station transmitter is shown in FIG. 9 with its corresponding timing sequence illustrated in FIG. 10.

Accordingly, a spread-spectrum transmitter for spread-spectrum processing a plurality of data signals on a carrier frequency may comprise base-synchronization means, a plurality of base-privacy means, a plurality of base-spreading means, combiner means, multiplexer means, and base-transmitter means. The plurality of base-privacy means is optional. In FIG. 7, the base-synchronization means is embodied as a synchronization code generator 81, and the plurality of base-privacy means is embodied as EXCLUSIVE-OR gate 51 and first privacy-code generator 52, EXCLUSIVE-OR gate 61 and second privacy-code generator 62, through EXCLUSIVE-OR gate 71 and $N^{th}$ privacy-code generator 72. The first privacy-code generator 51 generates a first privacy-code signal, the second privacy-code generator generates a second privacy-code signal, and the $N^{th}$ privacy-code generator generates an $N^{th}$ privacy code signal. EXCLUSIVE-OR gate 51 is coupled to first privacy code generator 52 and uses the first privacy-code signal for encoding the first data signal as a first privacy-encoded-data signal. EXCLUSIVE-OR gate 61 is coupled to second privacy-code generator 62 and uses the second privacy-code signal for encoding the second data signal as a second privacy-encoded-data signal. EXCLUSIVE-OR 71 is coupled to $N^{th}$ privacy-code generator 72 and uses the $N^{th}$ privacy-code signal for encoding the $N^{th}$ data signal as an $N^{th}$ privacy-encoded-data signal.

The plurality of base-spreading means is shown as EXCLUSIVE-OR gate 704 coupled to synchronization-code generator 81 and to synchronization-chip-code generator 701, EXCLUSIVE-OR gate 703 coupled to first message-chip-code generator 702, EXCLUSIVE-OR gate 773 coupled to second message-chip-code generator 772, through EXCLUSIVE-OR gate 783 coupled to $N^{th}$ message-chip-code generator 782.

The synchronization-chip-code generator 81 uses a synchronization-chip codeword for generating a synchronization-chip-code signal. EXCLUSIVE-OR gate 704 spread-spectrum processes the synchronization-code signal with the synchronization-chip-code signal to generate a spread-spectrum processed-synchronization-code signal. The first message-chip-code generator 702 uses a first message-chip codeword for generating a first message-chip-code signal. EXCLUSIVE-OR gate 703 spread-spectrum processes the first privacy-encoded-data signal, or the first data signal if privacy encoding is not used, with the first chip-code signal to generate a first spread-spectrum signal. The second message-chip-code generator 772 uses a second message-chip codeword for generating a second message-chip-code signal. EXCLUSIVE-OR gate 773 spread-spectrum processes the second privacy-encoded-data signal, or the second data signal if privacy encoding is not used, with the second message-chip-code signal to generate a second spread-spectrum signal. Similarly, the $N^{th}$ message-chip-code generator 782 uses an $N^{th}$ message-chip codeword for generating a $N^{th}$ message-chip-code signal. EXCLUSIVE-OR gate 783 spread-spectrum processes the $N^{th}$ privacy-encoded-data signal or the $N^{th}$ data signal if privacy encoding is not used, with the $N^{th}$ message-chip-code signal to generate an $N^{th}$ spread-spectrum signal.

The spread-spectrum processing of each of the plurality of privacy-encoded-data signals or each of the plurality of data signals, is done with proper timing and chip rate to produce a desired spread-spectrum processing gain. Timing for each privacy-code generator and for each message-chip-code generator may be from a common clock signal as illustrated in FIGS. 7 and 9.

The combiner means is shown as combiner 705. The EXCLUSIVE-OR gate 703 is coupled to the EXCLUSIVE-OR gate 51 and to combiner 705. The EXCLUSIVE-OR gate 773 is coupled to the EXCLUSIVE-OR gate 61 and to the combiner 705. The EXCLUSIVE-OR gate 783 is coupled to the EXCLUSIVE-OR gate 71 and to the combiner 705.

In a preferred embodiment, the combiner 705 linearly combines the plurality of spread-spectrum signals from the plurality of base-spreading means. Nonlinear combining may equivalently work without serious degradation in performance, however. The combiner 705 combines the plurality of spread-spectrum signals as a combined-plurality of spread-spectrum signals.

The multiplexer means is shown as multiplexer 708, first buffer 706 and second buffer 707. EXCLUSIVE-OR gate 704 is coupled to synchronization-code generator 81 and through second buffer 707 to the multiplexer 708. The combiner 705 is coupled through the first buffer 706 to the multiplexer 708. The multiplexer 708 time multiplexes the spread-spectrum-processed-synchronization-code signal with the combined-plurality of spread-spectrum signals, as a multiplexed-spread-spectrum signal. The first buffer 706 stores the combined-plurality of spread-spectrum signals until the multiplexer 708 selects the first buffer 706. The second buffer 707 stores the spread-spectrum-processed-synchronization-code signal until the multiplexer 708 selects the second buffer 707.

The base transmitter means is shown as an oscillator 74, a product device 78, a power amplifier 79, and an antenna 98. An isolator 99 may be inserted between the antenna 98 and the power amplifier 79 for isolating the base-station receiver from the base-station transmitter. The product device 78 may be a mixer or other device which can raise a spread spectrum signal to a carrier frequency. The product device 78 is coupled to the oscillator 74, the multiplexer 706 and the power amplifier 79.

The synchronization-code generator 81 generates a synchronization-code signal. The synchronization-chip-code generator 701 generates a chip-code signal, and the EXCLUSIVE-OR gate 704 spread-spectrum processes the synchronization-code signal with the chip-code signal to generator a spread-spectrum-processed-synchronization-code signal.

The plurality of privacy-code generators 52, 62, 72 generate a plurality of privacy-code signals. The plurality of EXCLUSIVE-OR gates 51, 61, 71, encode the plurality of data signals, $d_1(t), d_2(t), \ldots, d_N(t)$, with the plurality of privacy-code signals to generate a plurality of privacy-encoded-data signals, respectively. Thus, by way of example, the first data signal, $d_1(t)$, is encoded with the first privacy-code signal from the first privacy-code generator 52 by the EXCLUSIVE-OR gate 51 as the first privacy-encoded-data signal. The second data signal, $d_2(t)$, is encoded with the second privacy-code signal from the second privacy-code generator 62 by the EXCLUSIVE-OR gate 61 as the second privacy-encoded-data signal. The $N^{th}$ data signal, $d_N(t)$, is encoded by the $N^{th}$ privacy-code signal from the privacy-code generator 72 by the EXCLUSIVE-OR gate 71 as the $N^{th}$ privacy-encoded-data signal.

The plurality of EXCLUSIVE-OR gates 704, 703, 773, 783, spread spectrum process the synchronization-code signal and the plurality of privacy-encode data signals, or data signals if privacy encoding is not used, with a plurality of chip-code signals to generate a plurality of spread-spectrum signals. The plurality of chip-code signals are generated by the synchronization-chip-code generator 701, first message-chip-code generator 702, second message-chip-code generator 772 through $N^{th}$ message-chip-code generator 782. The plurality of EXCLUSIVE-OR gates 704,703,773,783 spread-spectrum process the synchronization-code signal and the plurality of privacy-encoded-data signals by modulo-2 adding the plurality of chip-code signals. Accordingly, the synchronization-code signal is modulo-2 added to the synchronization-chip-code signal from synchronization-chip-code generator 701 by EXCLUSIVE-OR gate 704. The first privacy-encoded-data signal is modulo-2 added by the EXCLUSIVE-OR gate 703 to the first chip-code signal from the first message-chip-code generator 702. The second privacy-encoded-data signal is modulo-2 added by the EXCLUSIVE-OR gate 773 to the second chip-code signal from the second message-chip-code generator 772. The $N^{th}$ privacy-encoded-data signal is modulo-2 added to the $N^{th}$ chip-code signal from the $N^{th}$ message-chip-code generator 782 by the EXCLUSIVE-OR gate 783.

The combiner 705 combines the plurality of spread-spectrum signals from the plurality of EXCLUSIVE-OR gates 703, 773, 783 to generate a combined-spread-spectrum signal. The multiplexer 706 time multiplexes the spread-spectrum-processed-synchronization-code signal with the combined-plurality of spread-spectrum signals.

The multiplexed-combined spread-spectrum signal is converted to a form suitable for sending over a communications channel by function of the oscillator 74 raising the multiplexed-combined-spread-spectrum signal to a carrier frequency with product device 78. The power amplifier 79 amplifies the multiplexed-combined-spread-spectrum signal at the carrier frequency, which is radiated by antenna 98.

Figure 8:
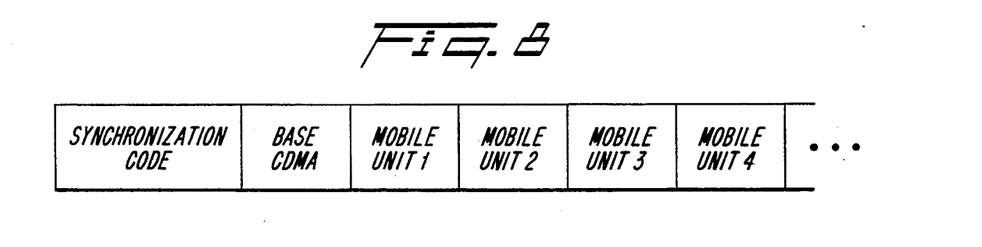
Figure 9:
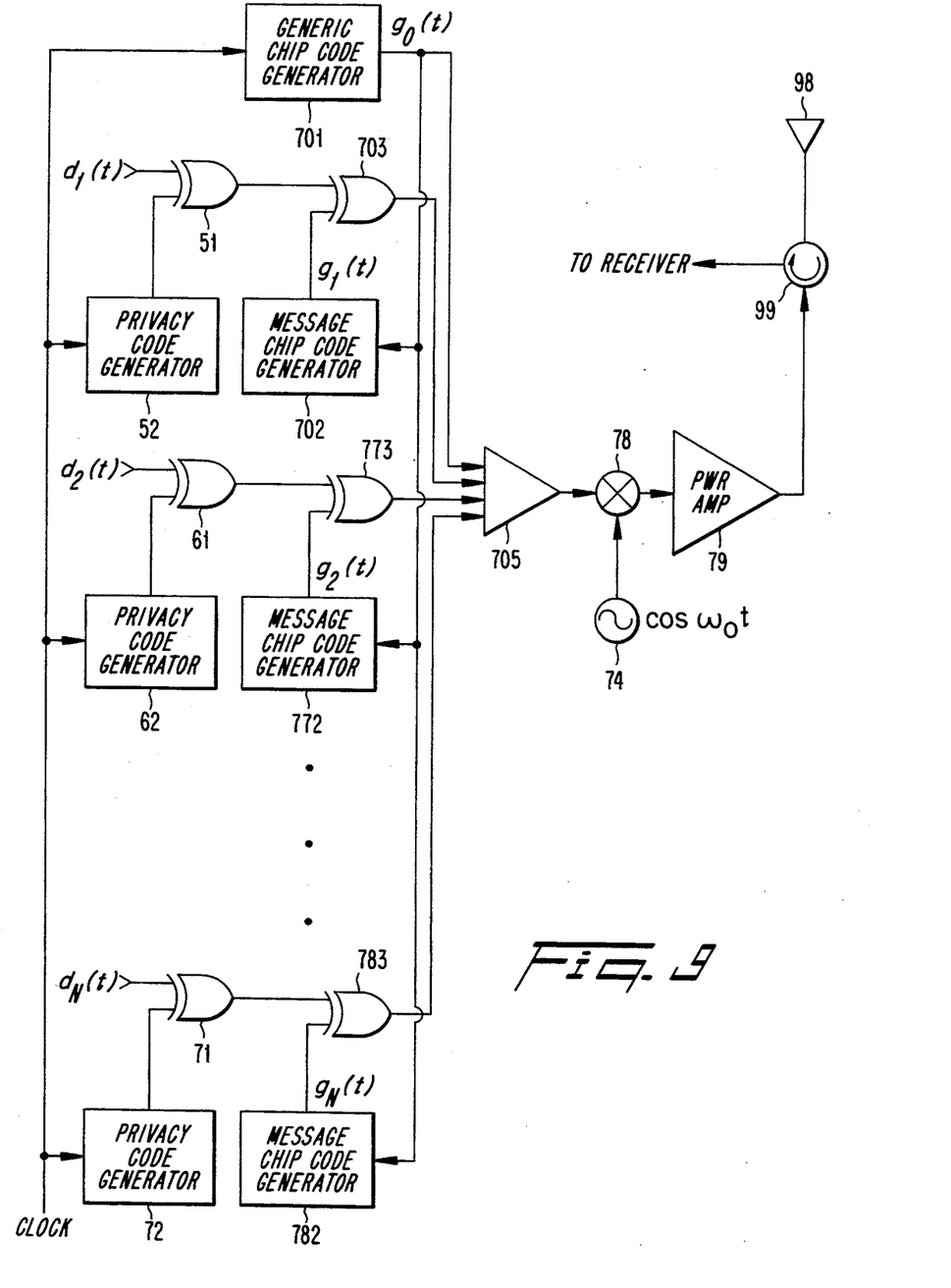
FIG. 9 is a block diagram of a base station transmitter.

The spread-spectrum system timing is shown in FIG. 8. In this case, the spread-spectrum-processed-synchronization-code signal is sent first and then the combined-plurality of spread-spectrum signals is sent as a base CDMA signal. Subsequently, each mobile unit sends its signal to the base station in its selected time slot, as previously discussed.

Figure 10:
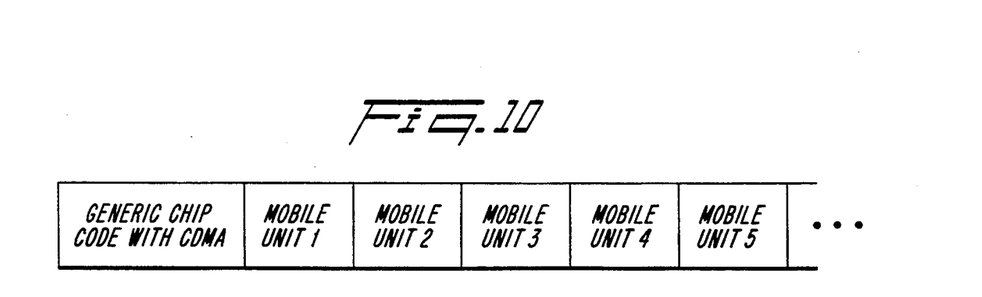
FIG. 10 is a timing diagram of data transmitted between the base station of FIG. 9 and a plurality of remote units.

The present invention of FIG. 7 can be modified as shown in FIG. 9 by having the synchronization-code signal become a generic-chip-code signal which is combined at the same time with the spread-spectrum signals from the plurality of EXCLUSIVE-OR gates 703, 773, 783. A generic-chip-code signal is used without spread-spectrum processing a data signal, or for spread-spectrum processing a data signal with a relatively low data rate. Accordingly, a spread-spectrum channel which is despread with the generic-chip-code signal can be used to derive a carrier signal, which effectively can be used as a pilot signal. The carrier signal or pilot signal can be used for synchronously despreading the other spread-spectrum channels and provide other timing at a remote unit receiver. In this case, as shown in FIG. 10, the generic-chip-code signal is sent concurrently in time with the plurality of spread-spectrum signals as the combined spread-spectrum signal, over the Communication channel. Subsequently, each mobile unit sends its message to the base station, as set forth previously, in a time slot measured from the generic-chip-code signal. Timing may be derived from a common clock signal and/or the generic-chip-code signal.

In use, a spread-spectrum transmitter of FIG. 1 at a base station encodes a plurality of data signals with a plurality of privacy-code signals to generate a plurality of privacy-encoded data signals, respectively. A synchronization-code signal is generated by the synchronization-code generator, and is time multiplexed with the plurality of privacy-encoded data signals by multiplexer 75 to generate a time-multiplexed signal. The time-multiplexed signal is spread-spectrum processed by EXCLUSIVE-OR gate 76 using a first chip-code signal generated by a chip-code generator 56, to generate a spread-spectrum-time-multiplexed signal. The spread-spectrum-time-multiplexed signal is transmitted on a first carrier frequency over a communications channel. The synchronization-code signal defines a frame which includes the plurality of privacy-encoded-data signals.

At a remote unit, the spread-spectrum-time-multiplexed signal is received and demultiplexed using despreader circuitry 155. A synchronization-code matched filter 157 detects the synchronization-code signal embedded in the despread signal, and generates a timing signal. The timing signal actuates the controller 161 for generating control signals, which cause the buffer 156 to store the selected privacy-encoded data signal embedded in the time-multiplexed signal from the despreader circuitry 155. The privacy-code generator 159 and EXCLUSIVE-OR gate 158 decodes the privacy-encoded data signal to generate the data signal being received from the base station.

At the remote unit, a remote-data signal, $d_{Hi}(t)$ is encoded by EXCLUSIVE-OR gate 133 by a remote-privacy-code signal from privacy-code generator 132, and the resulting remote-privacy-encoded data signal is stored in buffer 134. The buffer 134 stores the remote-privacy-encoded-data signal until the control signal is sent by controller 161 to transmit. The remote-privacy-encoded data signal is then spread-spectrum processed by EXCLUSIVE-OR gate 135 using a second chip-code signal generated by chip-code generator 165. The output of the EXCLUSIVE-OR gate 135 is a spread-spectrum signal. The control signal also actuated the transmit-receive switch 199 to the transmit position. The spread-spectrum signal is transmitted at a second carrier frequency over the communications channel to the base station.

The controller 161 generates the control signal which actuates the transmit-received switch 199, to be only in the transmit position while transmitting from the remote unit. Otherwise, the transmit-receive switch 199 is in the receive mode. Additionally, the remote unit has its timing based on detection of the synchronization-code signal, and transmits its spread-spectrum signal within a designated time slot. The designated time slot can correspond to the time slot of the privacy-encoded data signal being received by the remote unit from the base station.

At the base station a plurality of spread-spectrum signals are received and despread. The plurality of spread-spectrum signals have been designated herein as a spread-spectrum-time-division signal, inasmuch as the plurality of spread-spectrum signals are received sequentially in time. At the base station, each spread-spectrum signal is despread as a time-division signal. The time-division signal is demultiplexed by demultiplexer 115 as a plurality of remote-privacy-encoded data signals. Appropriate circuitry is used to decode the remote-privacy-encoded data signal as the remote-data signal, $d_{Hi}(t)$.

It will be apparent to those skilled in the art that various modifications may be made to the CDMA/TDMA spread-spectrum system of the instant invention without departing from the scope or spirit of the invention, and it is intended that the present invention cover modifications and variations of the CDMA/TDMA spread-spectrum system provided they come within the scope of the appended claims and their equivalents.

I claim:

1. A method for spread-spectrum processing a plurality of data signals on a carrier frequency $f_o$, comprising the steps of:

generating a plurality of privacy-code signals;

modulo adding each of the respective plurality of privacy-code signals to each of the plurality of data signals to generate a plurality of privacy-encoded data signals, respectively;

generating a synchronization-code signal;

time multiplexing the synchronization-code signal and the plurality of privacy-encoded-data signals, respectively, to generate a time-multiplexed signal;

generating a chip-code signal;

spread-spectrum processing the time-multiplexed signal with the chip-code signal as a spread spectrum-time-multiplexed signal; and transmitting the spread-spectrum-time-multiplexed signal on the carrier frequency over a communications channel.

2. The method as set forth in claim 1 wherein the step of transmitting includes the steps of:
generating a carrier frequency;
shifting the spread-spectrum-time-multiplexed signal to the carrier frequency;
amplifying the spread-spectrum-time-multiplexed signal at the carrier frequency; and
radiating the amplified spread-spectrum-time-multiplexed signal at the carrier frequency over the communications channel.

3. A method for spread-spectrum processing a plurality of data signals on a carrier frequency, comprising the steps of:
generating a synchronization-code signal;
time multiplexing the synchronization-code signal and the plurality of data signals, respectively, to generate the time-multiplexed signal;
spread-spectrum processing the time-multiplexed signal with a chip-code signal to generate a spread-spectrum-time-multiplexed signal; and
converting the spread-spectrum-time-multiplexed signal to a form suitable for sending over a communications channel.

4. The method as set forth in claim 3 wherein the step of spread-spectrum processing includes the steps of:
generating a chip-code signal; and
spread-spectrum processing the time-multiplexed signal with the chip-code signal as the spread-spectrum-time-multiplexed signal.

5. The method as set forth in claim 3 wherein the step of converting includes the steps of:
generating a carrier frequency;
shifting the spread-spectrum-time-multiplexed signal to the carrier frequency;
amplifying the spread-spectrum-tim-multiplexed signal at the carrier frequency; and
radiating the amplified spread-spectrum-time-multiplexed signal at the carrier frequency over a communications channel.

6. A method for spread-spectrum processing a spread-spectrum-time-division signal, wherein the spread-spectrum-time-division signal includes a plurality of spread-spectrum signals received sequentially in time from a plurality of remote units, comprising the steps of:
despreading the spread-spectrum-time-division signal as a time-division signal;
demultiplexing the time-division signal as a plurality of remote-privacy-encoded-data signals;
generating a synchronization-code signal;
generating a timing signal;
a generating a plurality of remote-privacy-code signals; and
decoding the plurality of remote-privacy-encoded-data signals, respectively, as a plurality of remote-data signals.

7. The spread-spectrum receiver as set forth in claim 6 wherein the steps of despreading includes the steps of:
generating a chip-code signal; and
despreading using the chip-code signal the received spread-spectrum-time-division signal as the time-division signal.

8. A method for spread-spectrum processing a spread-spectrum-time-division signal, wherein the spread-spectrum-time-division signal includes a plurality of spread-spectrum signals received sequentially in time from a plurality of remote units, comprising:
despreading the spread-spectrum-time-division signal as a time-division signal; and
demultiplexing the time-division signal as a plurality of remote-data signals.

9. The method as set forth in claim 8 wherein the steps of despreading includes the steps of:
generating a chip-code signal; and
despreading, using the chip-code signal, the received spread-spectrum-time-division signal as the time-division signal.

10. A method for spread-spectrum processing a spread-spectrum-time-division signal, wherein the spread-spectrum-time-division signal includes a plurality of spread-spectrum signal received sequentially in time from a plurality of remote units, comprising the steps of:
despreading the spread-spectrum-time-division signal as a time-division signal;
demultiplexing the time-division signal as a plurality of remote-privacy-encoded data signals; and
decoding the plurality of remote-privacy-encoded signals as a plurality of remote-data signals, respectively.

11. The method as set forth in claim 10 wherein the steps of despreading includes the steps of:
generating a chip-code signal; and
despreading, using the chip-code signal, the received spread-spectrum-time-division signal as the time-division signal.

12. The method as set forth in claim 11 wherein steps of synchronization includes the steps of:
generating a synchronization code; and
generating, using the synchronization-code signal a timing signal.

13. The method as set forth in claim 10 wherein the step of decoding includes the steps of:
generating, using the timing signal a plurality of privacy-coded signals; and
generating a synchronization code; and
generating, using the timing signal, the synchronization-code signal.

14. The method as set forth in claim 10 wherein the steps of decoding includes the steps of:
generating, using the timing signal, a plurality of privacy-code signals; and
decoding the plurality of privacy-encoded data signals as a plurality of data signals, respectively.

15. A method for receiving a spread-spectrum-time-multiplexed signal, having a synchronization signal and a plurality a privacy-encoded data signals including a first privacy-encoded-data signal, on a first carrier frequency, $f_1$, and for spread-spectrum transmitting a remote-data signal on a second carrier frequency, $f_2$, comprising the steps of:
despreading a spread-spectrum-time-multiplexed signal as a time-multiplexed signal;
generating, using a synchronization-code signal embedded in the time-multiplexed signal, a timing signal;
generating, in response to the control signal, a first privacy-code signal;
decoding the first privacy-encoded-data signal as a first data signal;

generating, in response to the control signal, a remote-privacy-code signal;

encoding the remote-data signal with the remote-privacy-code signal as a remote-privacy-encoded-data signal;

generating a second chip-code signal;

spread-spectrum processing the remote-privacy-encoded signal with the second chip-code signal as a spread-spectrum signal; and transmitting the spread-spectrum signal on the second carrier frequency, $f_2$.

16. The method as set forth in claim 15 wherein step of despreading includes:

despreading, using the first chip-code signal, the received spread-spectrum-time-multiplexed signal as the time-multiplexed signal; and filtering the time-multiplexed signal.

17. A method for receiving a spread-spectrum-time-multiplexed signal, having a synchronization-code signal and a plurality of privacy-encoded data signals including a first privacy-encoded data signal, at a first carrier frequency, and for spread-spectrum transmitting a remote-data signal at a second carrier frequency, comprising the steps of:

despreading the spread-spectrum-time-multiplexed signal as a time-multiplexed signal;

detecting in the time-multiplexed signal the synchronization-code signal and generating a timing signal;

decoding, using the timing signal, the first privacy-encoded data signal embedded in the time-multiplexed signal as a first data signal;

encoding, in response to the control signal, the remote-data signal with a remote-privacy-code signal as a remote-privacy-encoded data signal;

spread-spectrum processing the remote-privacy-encoded data signal with a second chip-code signal to generate a spread-spectrum signal; and converting the spread-spectrum signal to a form suitable for sending over a communications channel.

18. The method as set forth in claim 17 wherein the step of despreading includes the steps of:

generating a first chip-code signal;

despreading, using the first chip-code signal, the received spread-spectrum-time-multiplexed signal as the time-multiplexed signal; and filtering the time-multiplexed signal.

19. The method as set forth in claim 17 wherein the step of decoding includes the steps of:

storing, in response to the control signal, the first privacy-encoded data signal embedded in the time-multiplexed signal;

generating, in response to the control signal, a privacy-code signal; and decoding the first privacy-encoded data signal as the first data signal.

20. The method as set forth in claim 17 wherein the step of encoding includes the steps of:

generating, in response to the control signal, the remote-privacy-code signal; and encoding the remote-data signal with the remote-privacy-code signal as the remote-privacy-encoded data signal.

21. The method as set forth claim 17 wherein steps of spread-spectrum processing includes the steps of:

storing the remote-privacy-encoded data signal;

generating a second chip-code signal; and spread-spectrum processing the second privacy-encoded signal with the second chip-code signal as a spread-spectrum signal.

22. A method for receiving a spread-spectrum-time-multiplexed signal, having a synchronization-code signal and a plurality of data signals including a first data signal, at a first carrier frequency, and for spread-spectrum transmitting a remote-data signal at a second carrier frequency, comprising the steps of:

despreading the spread-spectrum-time-multiplexed signal as a time-multiplexed signal;

detecting in time-multiplexed signal the synchronization-code signal and generating a control signal;

spread-spectrum processing the remote-data signal with a second chip-code signal as a spread-spectrum signal; and converting the spread-spectrum signal to a form suitable for sending over a communications channel.

23. The method as set forth in claim 22 wherein said remote-despreader means includes the steps of:

generating a first chip-code signal;

despreading using the first chip-code signal the received spread-spectrum-time-multiplexed signal as the time-multiplexed signal; and filtering the time-multiplexed signal.

24. The method as set forth in claim 22 wherein the step of spread-spectrum processing includes the steps of:

storing the remote-data signal;

generating a second chip-code signal; and spread-spectrum processing the remote-data signal with the second chip-code signal to generate a spread-spectrum signal.

* * * * *